US010689995B2

(12) United States Patent
Morgan et al.

(10) Patent No.: US 10,689,995 B2
(45) Date of Patent: Jun. 23, 2020

(54) SIDE SEAL WITH REDUCED CORNER LEAKAGE

(71) Applicant: General Electric Company, Schenectady, NY (US)

(72) Inventors: Victor John Morgan, Simpsonville, SC (US); Jesse Ellis Barton, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 816 days.

(21) Appl. No.: 15/166,805

(22) Filed: May 27, 2016

(65) Prior Publication Data

US 2017/0342850 A1    Nov. 30, 2017

(51) Int. Cl.
| | | |
|---|---|---|
| *F01D 11/00* | (2006.01) | |
| *F01D 9/02* | (2006.01) | |
| *F02C 3/04* | (2006.01) | |
| *F16J 15/02* | (2006.01) | |

(52) U.S. Cl.
CPC ............ *F01D 11/005* (2013.01); *F01D 9/023* (2013.01); *F02C 3/04* (2013.01); *F16J 15/025* (2013.01); *F05D 2220/32* (2013.01); *F05D 2260/30* (2013.01)

(58) Field of Classification Search
CPC .......... F01D 9/023; F01D 11/005; F02C 3/04; F02C 7/28; F23R 3/60; F23R 2900/00012; F16J 15/025; F05D 2260/30; F05D 2220/3212
USPC .......................................................... 60/796
See application file for complete search history.

(56) References Cited

U.S. PATENT DOCUMENTS

| | | | |
|---|---|---|---|
| 3,657,882 A * | 4/1972 | Hugoson ................. | F01D 9/023 60/39.37 |
| 5,265,412 A | 11/1993 | Bagepalli et al. | |
| 5,987,879 A | 11/1999 | Ono | |
| 6,345,494 B1 * | 2/2002 | Coslow ................... | F01D 9/023 60/39.37 |
| 6,450,762 B1 | 9/2002 | Munshi | |
| 6,547,257 B2 | 4/2003 | Cromer | |
| 6,588,214 B2 | 7/2003 | Mack et al. | |
| 6,834,507 B2 | 12/2004 | Jorgensen | |
| 7,481,037 B2 | 1/2009 | Takaya et al. | |

(Continued)

OTHER PUBLICATIONS

Extended European Search Report and Opinion issued in connection with corresponding EP Application No. 17171359.7 dated Oct. 4, 2017.

*Primary Examiner* — Jason H Duger
(74) *Attorney, Agent, or Firm* — Dority & Manning, P.A.

(57) ABSTRACT

A sealing arrangement for sealing between a first stage nozzle and a plurality of aft frames includes a first inner seal and a second inner seal which are circumferentially oriented and circumferentially aligned. A side seal is radially disposed between the first inner seal and the second inner seal. The side seal includes a first portion that is axially offset from the first inner seal and the second inner seal and a second portion abutting the first inner seal and the second inner seal. Also disclosed is an aft frame having a forward face and an aft face. The aft frame includes at least one side seal slot that extends along a side portion. A first portion of the side seal slot is axially offset from the aft face. A second portion of the side seal slot is axially and radially offset from the first portion.

8 Claims, 8 Drawing Sheets

(56) References Cited

U.S. PATENT DOCUMENTS

| | | |
|---|---|---|
| 7,784,264 B2 | 8/2010 | Weaver et al. |
| 7,797,948 B2 | 9/2010 | Weaver et al. |
| 7,870,738 B2 * | 1/2011 | Zborovsky .............. F01D 9/023 277/592 |
| 7,908,866 B2 | 3/2011 | Kato et al. |
| 8,118,549 B2 * | 2/2012 | Schiavo .................. F01D 9/023 415/182.1 |
| 8,141,879 B2 | 3/2012 | Venkataraman et al. |
| 8,562,000 B2 | 10/2013 | Moehrle et al. |
| 8,661,828 B2 | 3/2014 | Pieussergues et al. |
| 8,985,592 B2 | 3/2015 | Green et al. |
| 9,115,585 B2 | 8/2015 | Melton et al. |
| 9,322,335 B2 * | 4/2016 | Charron .................... F02C 7/20 |
| 9,593,585 B2 * | 3/2017 | Green ........................ F01D 9/02 |
| 2002/0121744 A1 * | 9/2002 | Aksit ....................... F01D 9/023 277/411 |
| 2004/0031271 A1 | 2/2004 | Jorgensen |
| 2006/0123797 A1 | 6/2006 | Zborovsky et al. |
| 2006/0127219 A1 | 6/2006 | Zborovsky |
| 2009/0115141 A1 * | 5/2009 | Simmons ................ F01D 9/023 277/630 |
| 2009/0322036 A1 | 12/2009 | Halling |
| 2011/0020113 A1 | 1/2011 | Beeck |
| 2011/0304104 A1 | 12/2011 | McMahan et al. |
| 2012/0085103 A1 | 4/2012 | Lacy et al. |
| 2012/0200046 A1 | 8/2012 | Green et al. |
| 2012/0280460 A1 | 11/2012 | Cihlar et al. |
| 2013/0161914 A1 | 6/2013 | Sarawate et al. |
| 2013/0283817 A1 * | 10/2013 | Flanagan ................ F01D 9/023 60/800 |
| 2014/0260272 A1 * | 9/2014 | DiCintio ................ F02C 7/222 60/739 |
| 2014/0260318 A1 | 9/2014 | Willis et al. |
| 2015/0184528 A1 | 7/2015 | Belsom |

* cited by examiner

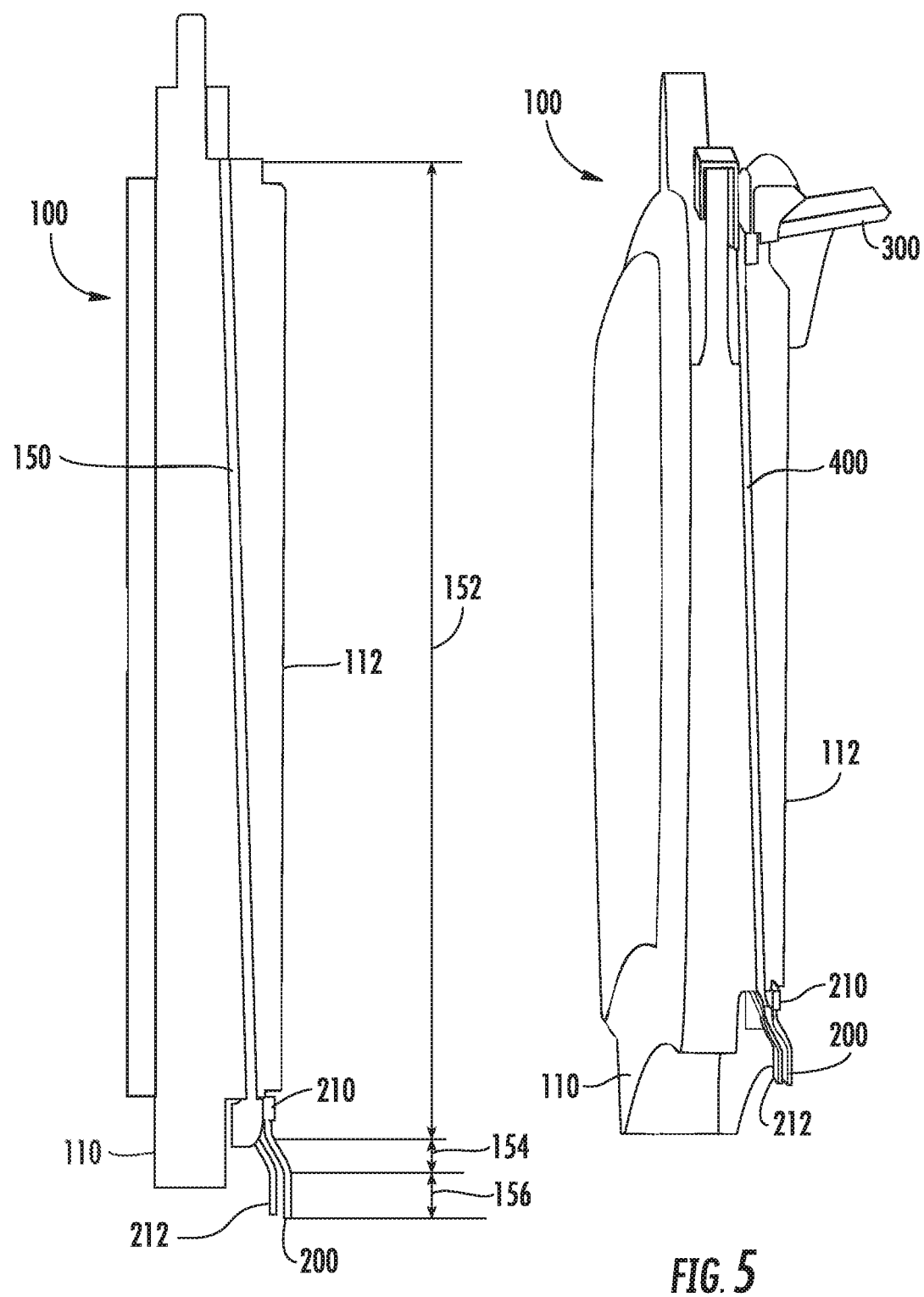

SIDE SEAL WITH REDUCED CORNER LEAKAGE

FIELD OF THE TECHNOLOGY

The subject matter disclosed herein relates to a combustor for a gas turbine. More specifically, the disclosure is directed to a sealing arrangement for the interface of one or more combustor transition ducts with one or more inlets of a first stage nozzle of a gas turbine.

BACKGROUND

Gas turbines typically comprise several interconnected discrete parts. A gas turbine generally includes an inlet section, a compression section, a plurality of combustors, a turbine section, and an exhaust section. The inlet section may include a series of filters, cooling coils, moisture separators, and/or other devices to purify and otherwise condition a working fluid (e.g., air) entering the gas turbine. The working fluid flows downstream from the inlet section to a compressor section where kinetic energy is progressively imparted to the working fluid to produce a compressed working fluid at a highly energized state. The compressed working fluid is mixed with a fuel from a fuel supply to form a combustible mixture within one or more combustors. The combustible mixture is burned to produce combustion gases having a high temperature and pressure. The combustion gases flow through a turbine of a turbine section wherein energy (kinetic and/or thermal) is transferred from the combustion gases to rotor blades, thus causing a shaft to rotate and produce work. For example, the rotation of the turbine shaft may drive the compressor to produce the compressed working fluid. Alternately or in addition, the shaft may connect the turbine to a generator for producing electricity. Exhaust gases from the turbine flow through an exhaust section that connects the turbine to an exhaust stack downstream from the turbine. The exhaust section may include, for example, a heat recovery steam generator for cleaning and extracting additional heat from the exhaust gases prior to release to the environment.

The combustors of a gas turbine are generally connected to the inlets of a first stage nozzle of the turbine section via transition ducts. Typically, each transition duct has an aft frame downstream of the combustor which connects to an inlet of the turbine section. The aft frame will usually have two arcuate portions which are typically referred to as inner and outer portions, being inner and outer in the radial direction with respect to the centerline axis of the turbine. The inner and outer portions of the aft frame are interconnected by radially extending linear portions, often referred to as side portions. Inner and outer circumferential seals are used to seal between the inner and outer portions of the aft frame and the corresponding inlet of the turbine section. Radially oriented side seals can be disposed between adjacent aft frames to substantially close and seal off the circumferential gaps between the side portion of one aft frame and the next aft frame.

The radially oriented side seals between circumferentially adjacent aft frames are axially offset (with reference to the turbine axis) from the inner and outer seals between each aft frame and the inlet. Because of this axial offset, gaps remain between the inner and outer seals and the side seals. Gas turbines usually burn hydrocarbon fuels and produce air polluting emissions such as oxides of nitrogen (NOx) and carbon monoxide (CO). Thus, gaps between the inner and outer seals and the side seals may lead to escape of working fluid (e.g., compressed air and/or combustion gases) flowing through the transition duct from the combustor to the first stage nozzle, which can cause lower performance and a shift in the emission of air pollutants.

BRIEF DESCRIPTION OF THE TECHNOLOGY

Aspects and advantages are set forth below in the following description, or may be obvious from the description, or may be learned through practice.

Improved sealing connections between the various parts of the gas turbine are desired in the art. In particular, gas turbines and associated sealing arrangements which facilitate a reduction or elimination of working fluid lost to the ambient atmosphere and/or emissions escaping to the ambient atmosphere would be advantageous.

One embodiment of the present disclosure is directed to a sealing arrangement for sealing between a first stage nozzle and a plurality of aft frames. The arrangement includes a first inner seal which is circumferentially oriented. The first inner seal comprises a forward surface and an aft surface. The arrangement also includes a second inner seal adjacent to the first inner seal. The second inner seal comprises a forward surface and an aft surface. The second inner seal is circumferentially oriented and circumferentially aligned with the first inner seal. The first inner seal and the second inner seal are axially aligned. A side seal is radially disposed between the first inner seal and the second inner seal. The side seal includes a first portion that is axially offset from the first inner seal and the second inner seal and a second portion abutting the first inner seal and the second inner seal. The first portion of the side seal is radially offset from the first inner seal and the second inner seal.

Another embodiment of the present disclosure is directed to a sealing arrangement wherein one or more of the first inner seal and the second inner seal comprises a frame and a guide tab. The one or more guide tabs abuts a forward surface of the second portion of the side seal and biases the side seal axially towards the forward surface of the first inner seal and the forward surface of the second inner seal such that an aft surface of the second portion of the side seal engages with the forward surface of the first inner seal and the forward surface of the second inner seal.

Another embodiment of the present disclosure is directed to a sealing arrangement wherein the first portion of the side seal is parallel to the first inner seal and the second inner seal.

Another embodiment of the present disclosure is directed to a sealing arrangement wherein the second portion of the side seal is oblique to the first inner seal and the second inner seal.

Another embodiment of the present disclosure is directed to a sealing arrangement wherein the side seal further comprises an intermediate portion between the first portion and the second portion and the intermediate portion of the side seal is oblique to the first inner seal and the second inner seal.

Another embodiment of the present disclosure is directed to a sealing arrangement wherein the side seal comprises a rigid material and said first, second, and intermediate portions are pre-formed.

Another embodiment of the present disclosure is directed to a sealing arrangement wherein one or more of the first inner seal and the second inner seal comprises a frame and a guide tab, and the side seal is sufficiently flexible to form the first, second, and intermediate portions upon interacting with the guide tab without undergoing plastic deformation.

Another embodiment of the present disclosure is directed to an aft frame for a gas turbine combustor transition duct. The aft frame includes a forward face, an aft face, an inner portion radially separated from an outer portion, and a pair of opposing side portions that extend radially between the inner portion and the outer portion. At least one of the side portions defines a side seal slot that extends along the side portion between the inner portion and the outer portion of the aft frame. A first portion of the side seal slot is axially offset from the aft face. A second portion of the side seal slot adjacent to one of the inner portion or the outer portion is axially and radially offset from the first portion.

Another embodiment of the present disclosure is directed to an aft frame further comprising an inner seal disposed on the inner portion and an outer seal disposed on the outer portion; wherein the second portion of the side seal slot is defined by a tab on one of the inner seal or the outer seal.

Another embodiment of the present disclosure is directed to an aft frame wherein the side seal slot comprises a protrusion which extends axially toward the aft face and defines the second portion of the side seal slot.

Another embodiment of the present disclosure is directed to an aft frame wherein the first portion of the side seal slot is oblique to the aft face.

Another embodiment of the present disclosure is directed to an aft frame wherein the first portion of the side seal slot is parallel to the aft face.

Another embodiment of the present disclosure is directed to an aft frame wherein the second portion of the side seal slot is parallel to the aft face and the side seal slot further comprises an intermediate portion between the first portion of the side seal slot and the second portion of the side seal slot. The intermediate portion of the side seal slot is oblique to the aft face.

Another embodiment of the present disclosure is directed to an aft frame wherein the side seal slot further comprises a third portion adjacent to the other of the inner portion and the outer portion, which is axially and radially offset from the first portion.

Another embodiment is directed to a gas turbine. The gas turbine includes a compressor, a turbine and a combustor disposed downstream from the compressor and upstream from the turbine. The combustor includes an upstream end, a downstream end, and a transition duct which defines a flow path from the compressor to the turbine. Also included is an aft frame that circumferentially surrounds the downstream end, the aft frame having a forward face and an aft face. The aft frame further comprises an inner portion radially separated from an outer portion and a pair of opposing side portions that extend radially between the inner portion and the outer portion. At least one of the side portions defines a side seal slot that extends along said side portion between the inner portion and the outer portion of the aft frame. A first portion of the side seal slot is axially offset from the aft face of the aft frame and a second portion of the side seal slot adjacent one of the inner portion of the aft frame or the outer portion of the aft frame is axially and radially offset from the first portion.

Those of ordinary skill in the art will better appreciate the features and aspects of such embodiments, and others, upon review of the specification.

BRIEF DESCRIPTION OF THE DRAWINGS

A full and enabling disclosure of the of various embodiments, including the best mode thereof to one skilled in the art, is set forth more particularly in the remainder of the specification, including reference to the accompanying figures, in which:

FIG. 4 is a side view of an aft frame with an inner seal disposed thereon;

FIG. 5 is a perspective view of an aft frame with inner and outer seals disposed thereon;

DETAILED DESCRIPTION

Figure 1:
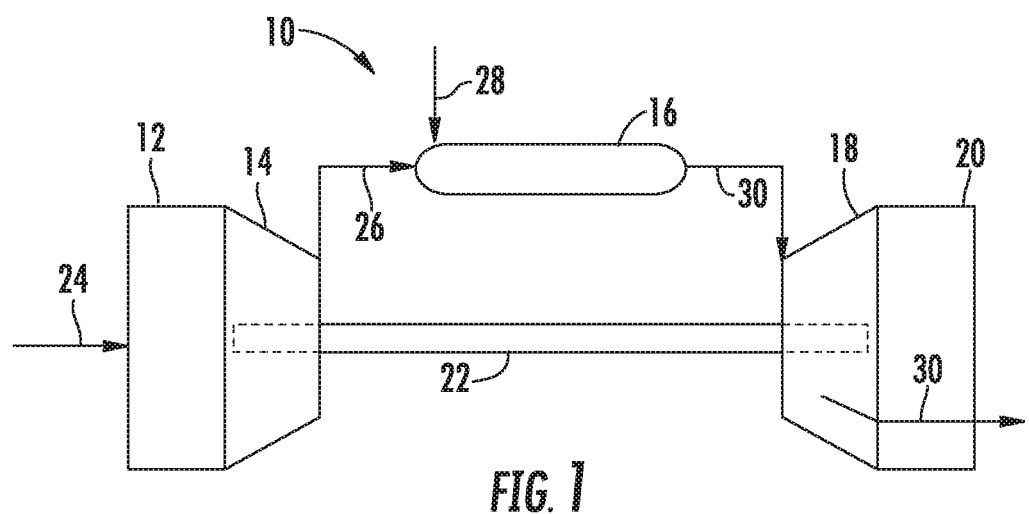
FIG. 1 illustrates a schematic diagram of an exemplary gas turbine that may incorporate various embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. Although exemplary embodiments of the present disclosure will be described generally in the context of a land based power generating gas turbine combustor for purposes of illustration, one of ordinary skill in the art will readily appreciate that embodiments of the present disclosure may be applied to any style or type of combustor for a turbomachine and are not limited to combustors or combustion systems for land based power generating gas turbines unless specifically recited in the claims.

Referring now to the drawings, FIG. 1 illustrates a schematic diagram of an exemplary gas turbine 10 that may incorporate various embodiments of the present invention. As shown, the gas turbine 10 generally includes an inlet section 12, a compressor 14 disposed downstream of the inlet section 12, at least one combustor 16 disposed downstream of the compressor 14, a turbine 18 disposed downstream of the combustor 16 and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustor 16. At least a portion of the compressed air 26 is mixed with a fuel 28 within the combustor 16 and burned to produce combustion gases 30. The combustion gases 30 flow from the combustor 16 into the turbine 18, wherein energy (kinetic and/or thermal) is transferred from the combustion gases 30 to rotor blades (not shown), thus causing shaft 22 to rotate. The mechanical rotational energy may then be used for various purposes such as to power the compressor 14 and/or to generate electricity. The combustion gases 30 exiting the turbine 18 may then be exhausted from the gas turbine 10 via the exhaust section 20.

Figure 2:
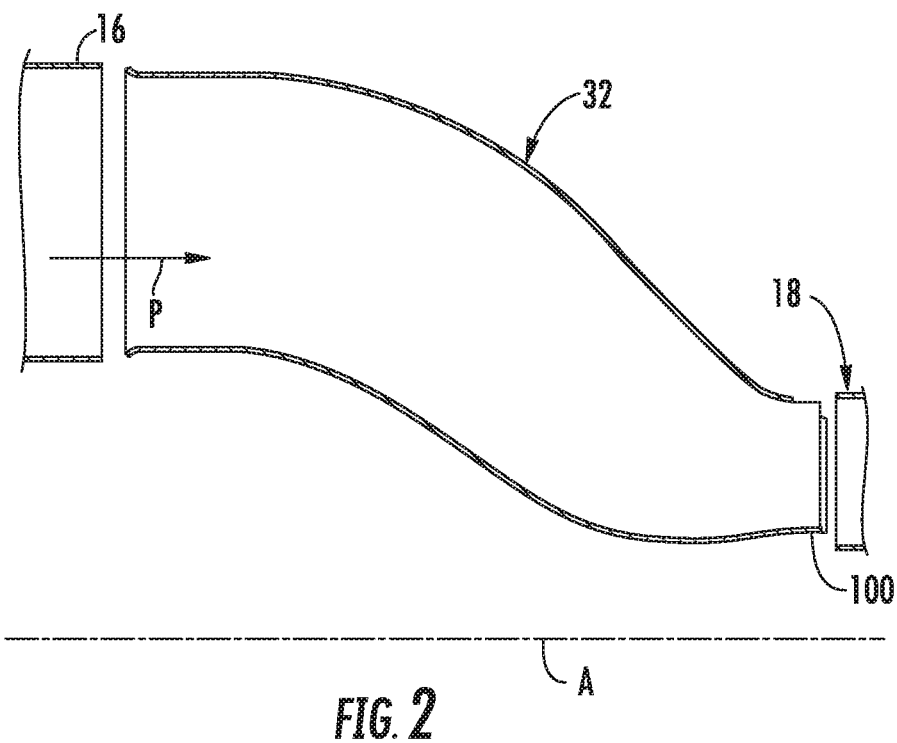
FIG. 2 illustrates a section view of a transition duct between a combustor and an inlet according to at least one embodiment.

As illustrated in FIG. 2, the combustor 16 may be connected to the turbine 18 via a transition duct 32 including an aft frame 100. The transition duct 32 defines a flow path P. Also shown in FIG. 2 is the central axis A of turbine 18, which defines an axial direction that is substantially parallel to and/or coaxially aligned with axis A, a radial direction perpendicular to axis A, and a circumferential direction extending around axis A.

Figure 3:
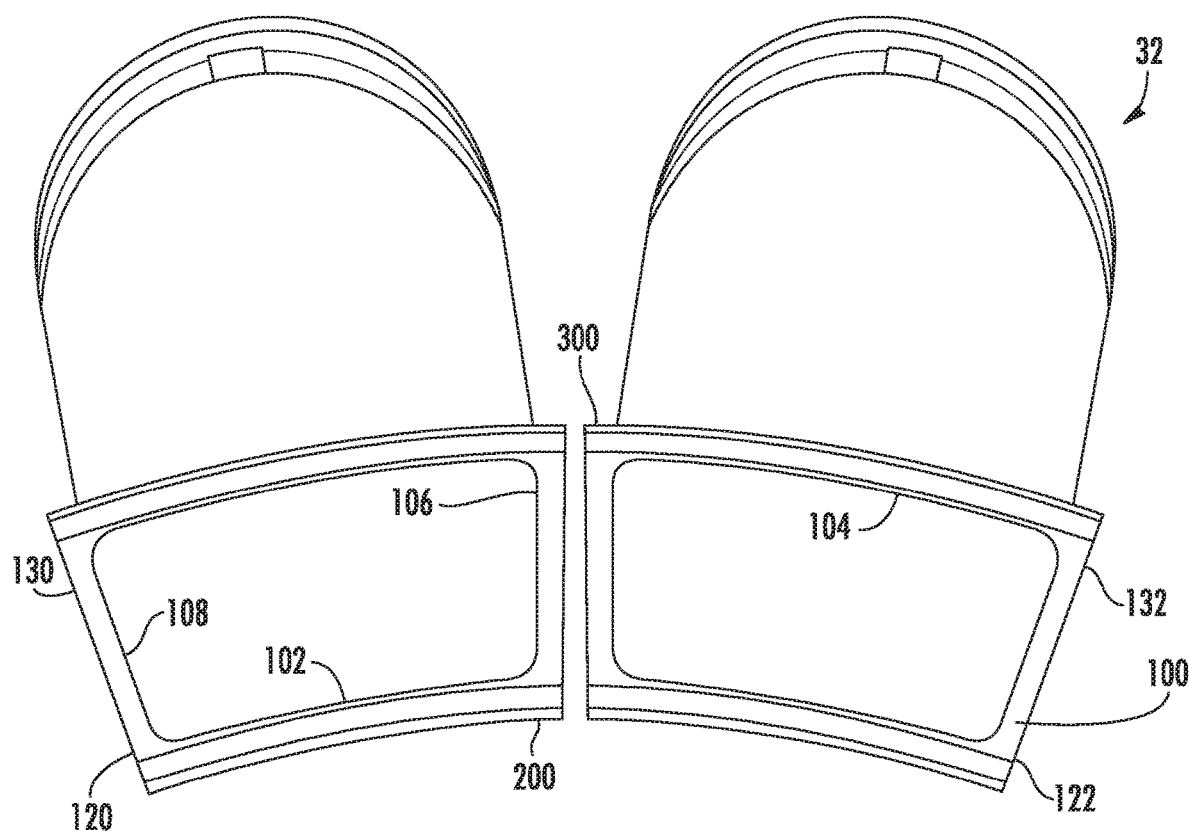
FIG. 3 is a perspective view of circumferentially adjacent aft frames.

Referring now to FIG. 3, a pair of circumferentially arranged transition ducts 32 are illustrated, each having an aft frame 100 that surrounds its respective downstream end. As illustrated in FIG. 3, in some embodiments, the aft frame may have an inner portion 102 and an outer portion 104, with a pair of opposing side portions 106 and 108 that extend radially between the inner and the outer portions 102 and 104. Also illustrated in FIG. 3 is an inner seal 200 and an outer seal 300 respectively disposed on the inner portion 102 and outer portion 104 of each aft frame 100. In the exemplary embodiment illustrated in FIG. 3, inner seal 200 and outer seal 300 are circumferentially oriented, each inner seal 200 is circumferentially aligned with the other inner seal 200 on the adjacent aft frame 100, and each outer seal 300 is circumferentially aligned with the other outer seal 300 on the adjacent aft frame 100. As illustrated in FIGS. 3 through 5, the aft frame 100 may include a forward face 110 and an aft face 112. The intersections of side portions 106 and 108 with inner portion 102 define inner corners 120 and 122, and the intersections of side portions 106 and 108 with outer portion 104 define outer corners 130 and 132. A radially oriented side seal 400 is disposed between the aft frames 100 and the inner and outer seals 200 and 300 disposed thereon. In the description herein, certain features of the aft frame 100 and seals, 200, 300, and 400 will be described with reference to one or both inner corners 120 and 122, nonetheless, it should recognized by one of ordinary skill in the art that such features can be associated with any or all of inner corners 120, 122 or outer corners 130, 132.

Figure 9:
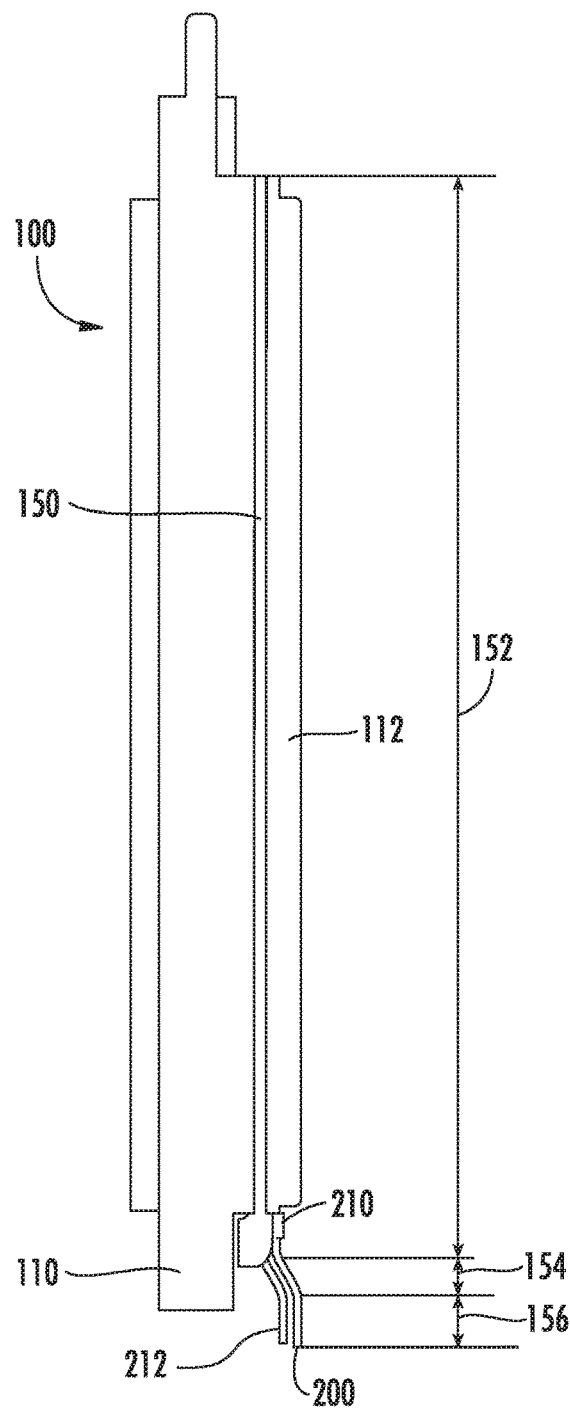
FIG. 9 is an enlarged side view of a side seal slot near a corner of an aft frame.

As FIG. 4 illustrates, some embodiments may have a frame 210 and guide tab 212 on inner seal 200, and one or both of inner seal 200 and outer seal 300 may have a similar frame and a guide tab thereon. As illustrated in FIGS. 5 and 9, in such embodiments the guide tab 212 biases the side seal 400 axially towards aft frame 100 and/or forward surface 202 of inner seal 200.

Figure 6:
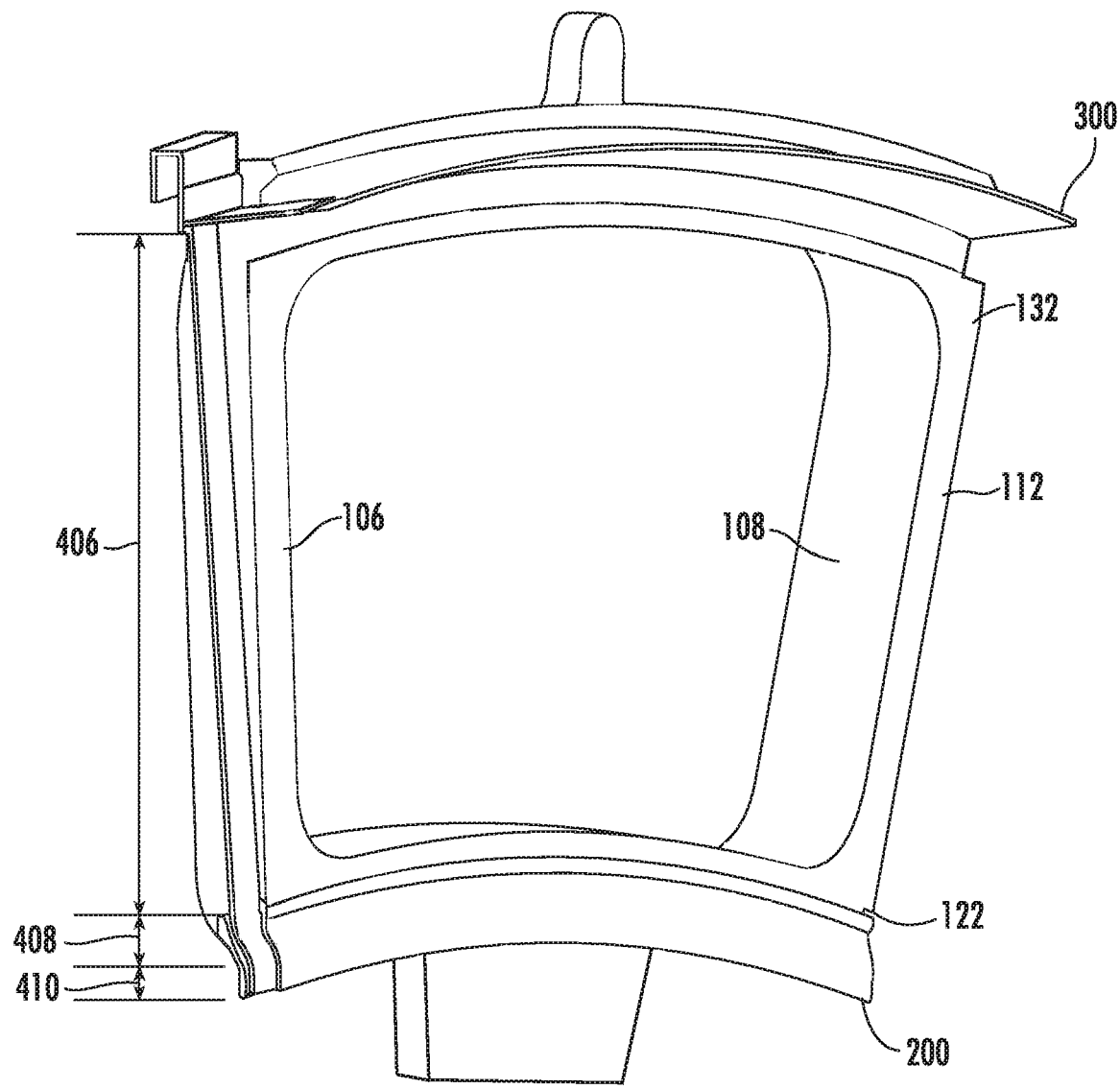
FIG. 6 is a perspective view of an aft frame and seals disposed thereon.

As shown in FIG. 4, in some embodiments the aft frame 100 may have a side seal slot 150. Although the side seal slot 150 will be generally described with reference to one side portion 106 the for clarity, it should recognized by one of ordinary skill in the art that either or both of the opposing side portions 106 and 108 of the aft frame 100 may include a side seal slot 150 as described herein. The side seal slot 150 may include a first portion 152 axially offset from the aft face 112 and a second portion 156 axially and radially offset from the first portion 152. In some embodiments, the side seal slot 150 may also include an intermediate portion 154. As illustrated in, e.g., FIG. 5, in some embodiments side seal slot 150 is configured for receiving side seal 400 such that a first portion 406 of side seal 400 is radially and axially offset from the inner and outer seals 200 and 300, and for example as illustrated in FIG. 6, second portion 410 of side seal 400 is radially and axially offset from the first portion 406 and abuts the inner seal 200.

As illustrated in FIG. 5, in some embodiments, the side seal 400 may have a first portion 406 that is oblique to the inner seal 200. As illustrated in FIG. 6, in some embodiments, the second portion 410 may be substantially parallel to the inner seal 200, and there may be an intermediate portion 408 between the first portion 406 and the second portion 410 which is oblique to the inner seal 200.

Figure 7:
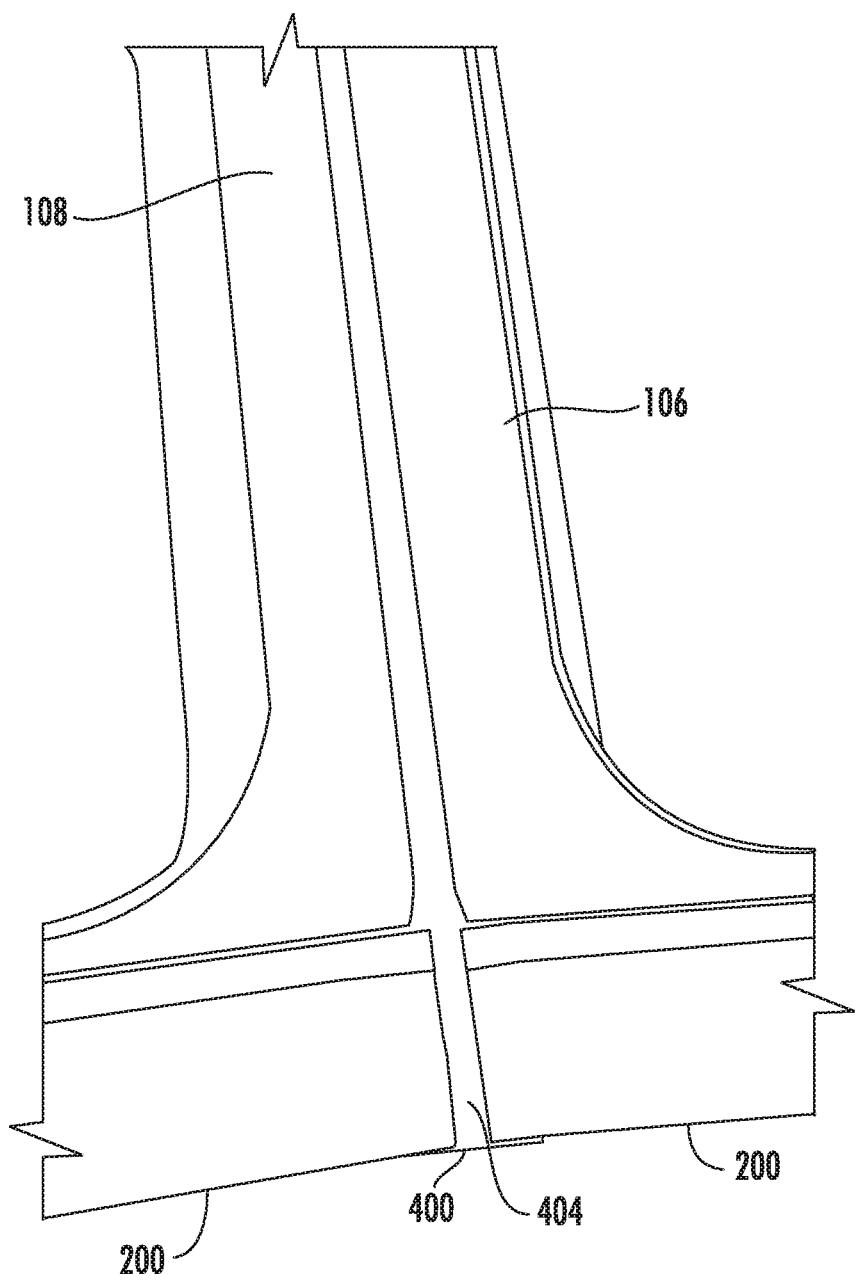
FIG. 7 is an enlarged view of circumferentially adjacent aft frames.
Figure 8:
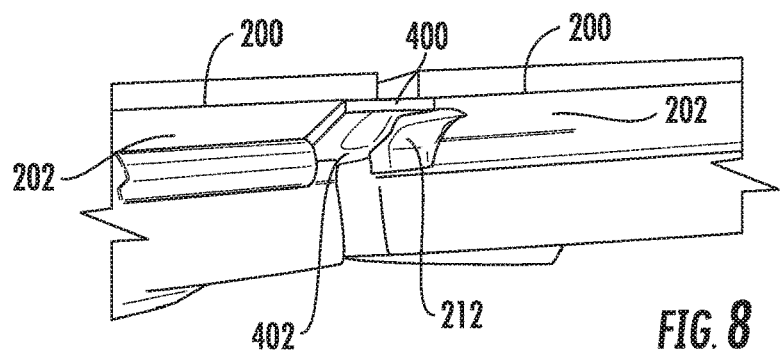
FIG. 8 is an enlarged view in a radial direction of circumferentially adjacent aft frames with circumferential and radial seals.

As illustrated in FIG. 7, an aft surface 404 of side seal 400 abuts forward surfaces 202 of inner seals 200. As can be seen in FIGS. 6-8 and 12, the aft surface 404 of side seal 400 partially overlaps the inner seals 200 in both the radial and circumferentail directions. As illustrated in FIG. 8, a tab 212 is provided on one inner seal 200 which abuts forward surface 402 and biases the side seal 400 axially toward the inner seal 200. Tab 212 could also be provided on both inner seals 200 or one or both outer seals 300 separately or in combination with the tab 212 illustrated in FIG. 8.

Figure 12:
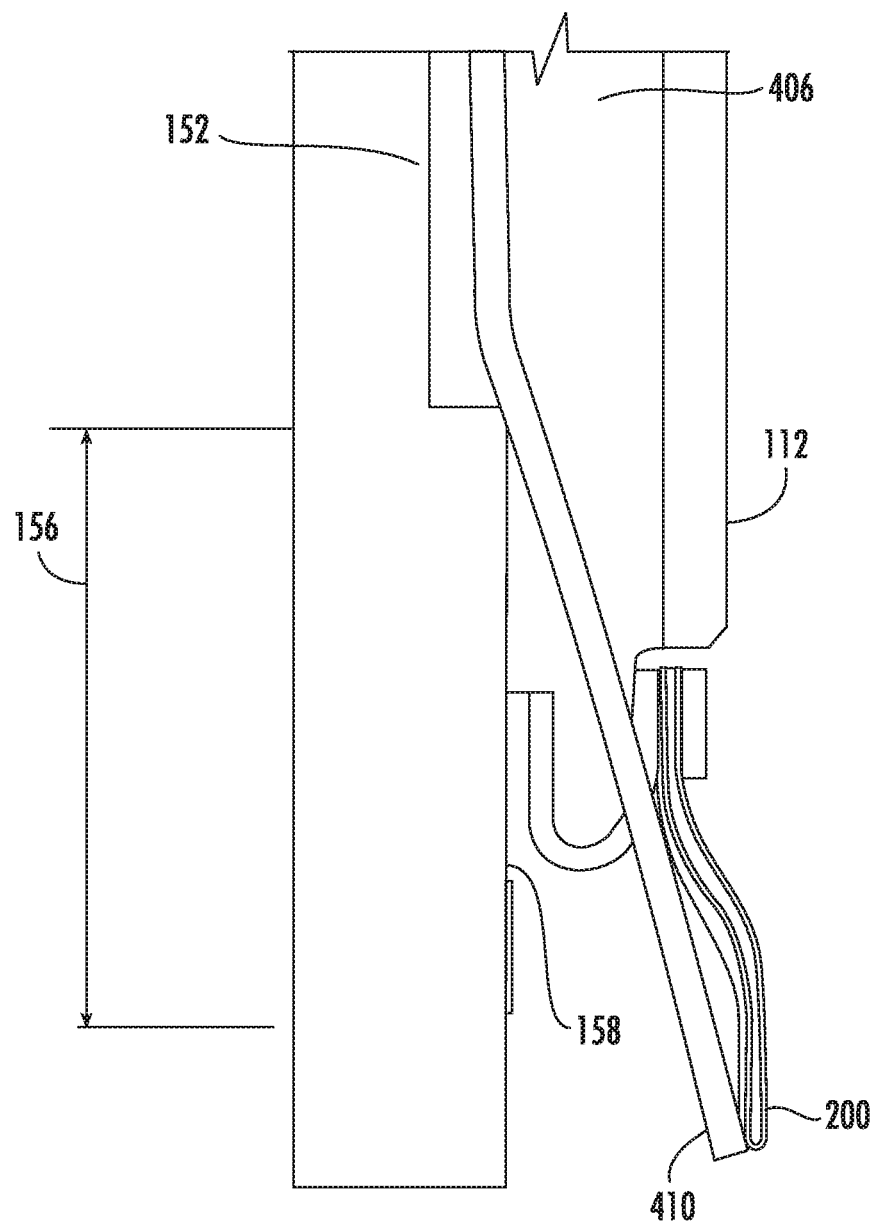
FIG. 12 is an enlarged side view of a side seal slot near a corner of an aft frame.

As illustrated in FIGS. 9 and 12, some embodiments may include a side seal slot 150 having a first portion 152 parallel to the aft face 112. It will be recognized by one of ordinary skill in the art that side seal 400 is generally congruent to the side seal slot 150, e.g., in embodiments where first portion 152 of side seal slot 150 is parallel to aft face 112, a side seal 400 may also be provided, and if so the side seal 400 would also have its first portion 406 parallel to aft face 112.

As illustrated in FIGS. 4 and 9, some embodiments may include a second portion 156 of the side seal slot 150 that is parallel to the aft face 112 and an intermediate portion 154 that is oblique thereto. Further, in such embodiments, e.g., as illustrated in FIGS. 5 and 6, the side seal 400 will have a second portion 410 parallel to the inner seal 200 and an intermediate portion 408 that is oblique thereto. In other embodiments, for example as illustrated in FIG. 12, the second portion 410 can be oblique to the aft face 112.

Figure 10:
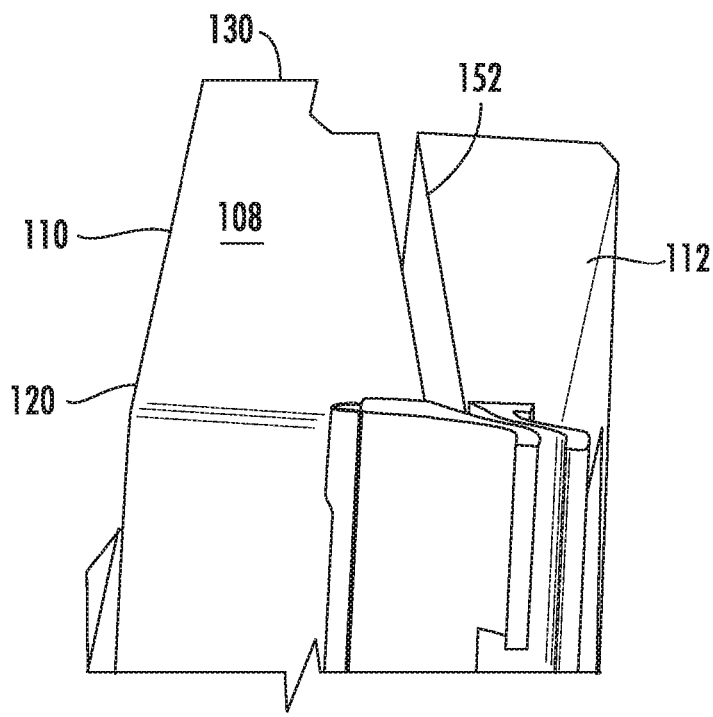
FIG. 10 is an enlarged view in a radial direction of a side seal slot near a corner of an aft frame.
Figure 11:
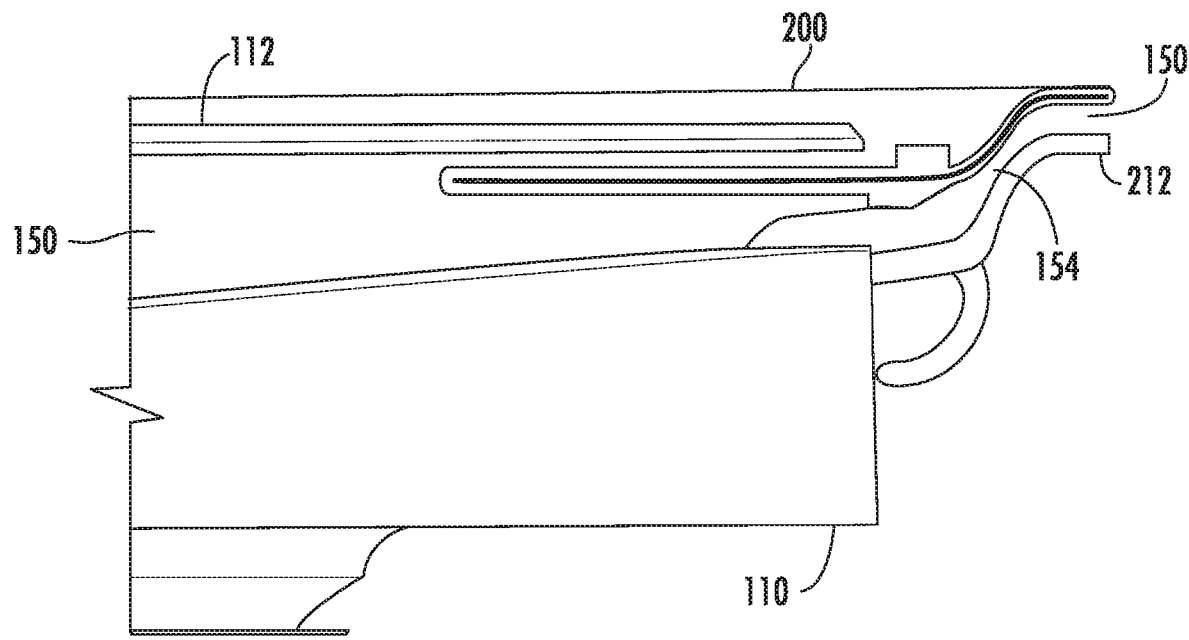
FIG. 11 is an enlarged view of a side seal slot near a corner of an aft frame.

As illustrated in FIG. 10, in some embodiments first portion 152 of the side seal slot 150 may be oblique to the aft face 112. As illustrated in FIG. 11, in some embodiments, side seal slot 150 may have a second portion 156 substantially parallel to the aft face 112, and there may be an intermediate portion 154 between the first portion 152 and the second portion 156 which is oblique to the aft face 112. As illustrated in FIG. 12, in some embodiments, first portion 152 of side seal slot 150 may be parallel to the aft face 112. The second portion may be defined by a protrusion 158, as illustrated in FIG. 12, or guide tab 212, as illustrated in FIG. 9. As illustrated in FIG. 12, in some embodiments, side seal 400 may have a first portion 406 that is parallel to the inner seal 200 and a second portion 410 may be oblique to the inner seal 200.

In any of the foregoing embodiments, the side seal 400 may be composed of a relatively rigid material with the first (406), second (410), and/or intermediate (408) portions pre-formed, or may be sufficiently flexible to form said first, second, and/or intermediate portions upon insertion into the side seal slot 150 (e.g., interacting with the guide tab 212 or protrusion 158) without undergoing plastic deformation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. For example, the exemplary description in the foregoing pertaining to the inner corners of the aft frame can also be implemented at one or more outer corners of the aft frame as well as or instead of the inner corner(s). Such other examples are intended to be within the scope of the claims if they include structural elements that do not differ from the literal language of the claims, or if they include equivalent structural elements with insubstantial differences from the literal language of the claims.

What is claimed is:

1. An aft frame that circumferentially surrounds the downstream end of a gas turbine combustor transition duct, the aft frame comprising:
   a forward face;
   an aft face;
   an inner portion radially separated from an outer portion and a pair of opposing side portions that extend radially between the inner portion and the outer portion, the side portions spaced apart from each other on opposite sides of the downstream end of the transition duct;
   at least one of the side portions defines a side seal slot that extends along the at least one of the side portions between the inner portion and the outer portion of the aft frame;
   a first portion of the side seal slot axially offset from the aft face and oblique to the aft face, the first portion of the side seal slot extending across the at least one of the side portions of the aft frame from the inner portion of the aft frame to the outer portion of the aft frame; and
   a second portion of the side seal slot adjacent to one of the inner portion or the outer portion, which is axially and radially offset from the first portion.

2. The aft frame of claim 1, further comprising an inner seal disposed on the inner portion and an outer seal disposed on the outer portion; wherein the second portion of the side seal slot is defined by a tab on one of the inner seal or the outer seal.

3. The aft frame of claim 1, wherein the second portion of the side seal slot is parallel to the aft face, the side seal slot further comprises an intermediate portion between the first portion of the side seal slot and the second portion of the side seal slot; and the intermediate portion of the side seal slot is oblique to the aft face.

4. The aft frame of claim 1, wherein the side seal slot further comprises a third portion adjacent to the other of the inner portion or the outer portion, which is axially and radially offset from the first portion.

5. A gas turbine, comprising:
   a compressor;
   a turbine;
   a combustor disposed downstream from the compressor and upstream from the turbine, the combustor comprising:
      an upstream end;
      a downstream end;
      a transition duct which defines a flow path from the compressor to the turbine; and
      an aft frame that circumferentially surrounds the downstream end, the aft frame having a forward face and an aft face, the aft frame further comprising:
         an inner portion radially separated from an outer portion and a pair of opposing side portions that extend radially between the inner portion and the outer portion, the side portions spaced apart from each other on opposite sides of the downstream end;
         at least one of the side portions defines a side seal slot that extends along the side portion between the inner portion and the outer portion of the aft frame;
         a first portion of the side seal slot axially offset from the aft face of the aft frame and oblique to the aft face, the first portion of the side seal slot extending across the at least one of the side portions of the aft frame from the inner portion of the aft frame to the outer portion of the aft frame; and
         a second portion of the side seal slot adjacent one of the inner portion of the aft frame or the outer portion of the aft frame, which is axially and radially offset from the first portion.

6. The gas turbine of claim 5, further comprising an inner seal disposed on the inner portion of the aft frame and an outer seal disposed on the outer portion of the aft frame; wherein the second portion of the side seal slot is defined by a tab on one of the inner seal or the outer seal.

7. The gas turbine of claim 5, wherein the second portion of the side seal slot is parallel to the aft face of the aft frame; wherein the side seal slot further comprises an intermediate portion between the first portion of the side seal slot and the second portion of the side seal slot; and wherein the intermediate portion of the side seal slot is oblique to the aft face of the aft frame.

8. The gas turbine of claim 5, wherein the side seal slot further comprises a third portion adjacent to the other of the inner portion of the aft frame or the outer portion of the aft frame which is axially and radially offset from the first portion.

* * * * *